UNITED STATES PATENT OFFICE.

CHARLES T. GRILLEY, OF NEW HAVEN, CONNECTICUT.

IMPROVEMENT IN CAPPING WOOD-SCREWS.

Specification forming part of Letters Patent No. 59,591, dated November 13, 1866.

*To all whom it may concern:*

Be it known that I, CHARLES T. GRILLEY, of New Haven, in the county of New Haven and State of Connecticut, have invented certain new and useful Improvements in Capping Screws; and I hereby declare the following to be a full, clear, and exact description of the same.

In the manufacture of capped screws as at present conducted great difficulty is experienced in regard to the formation of the nick in the cap. In case the nick is formed in the cap previously to its being closed upon the screw-head, there is danger of injuring or closing up the nick in the cap during the operation of closing the cap on the screw, this necessitating the reopening of the nick; and if the blank cap be closed on the head the operator is put to considerable trouble, and much time is consumed in finding the nick in the screw-head, which has been thus covered by the cap.

The object of my present invention is to obviate these difficulties, and to do this I proceed in the following manner:

It is well known that the nick or notch in the heads of screws in which the screw-driver may be inserted is formed by means of a circular saw revolving with extreme velocity, which, when brought in contact with the screw-head, cuts out and forms almost instantaneously the said nick. Now, instead of closing the cap-blank upon the nicked head of the screw, I take a screw of otherwise ordinary manufacture, but in which no nick or notch has been formed. Upon this head I close the cap-blank, which is likewise not nicked, by any ordinary or suitable means.

After the operation has been completed and the blank cap is fitted to and firmly closed upon the screw-head, I then take this capped screw, and by any of the methods now in use bring it in contact with a circular saw, revolving rapidly, as above said, which cuts in both the cap and the screw-head a nick or notch, as described. By this method I am enabled to bring the cap and screw-head in close contact with one another, and to bind them firmly together before forming or cutting the nick in either, and after this operation I nick the cap and screw-head simultaneously by bringing them in contact with a revolving saw, which notches them almost instantaneously.

Having thus described my improvements, what I claim as my invention, and desire to secure by Letters Patent, is—

In the manufacture of capped screws, the method herein indicated, whereby the nicks in the cap and screw-head are formed simultaneously after the cap has been applied and closed upon the screw, as and for the purposes herein set forth.

In testimony whereof I have signed my name to this specification before two subscribing witnesses.

C. T. GRILLEY.

Witnesses:
LEONARD F. MORSE,
A. POLLOK.